United States Patent
Pham et al.

(10) Patent No.: US 11,521,208 B2
(45) Date of Patent: Dec. 6, 2022

(54) SYSTEM AND METHOD FOR AUTHENTICATING TRANSACTIONS FROM A MOBILE DEVICE

(71) Applicant: Capital One Services, LLC, McLean, VA (US)

(72) Inventors: Vincent Pham, Champaign, IL (US); Kenneth Taylor, Champaign, IL (US); Austin Walters, Savoy, IL (US); Anh Truong, Champaign, IL (US); Jeremy Goodsitt, Champaign, IL (US); Fardin Abdi Taghi Abad, Champaign, IL (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 241 days.

(21) Appl. No.: 16/174,032

(22) Filed: Oct. 29, 2018

(65) Prior Publication Data
US 2020/0019970 A1  Jan. 16, 2020

Related U.S. Application Data (62) Division of application No. 16/032,303, filed on Jul. 11, 2018, now abandoned.

(51) Int. Cl.
*G06Q 20/40* (2012.01)
*G06T 7/70* (2017.01)
(Continued)

(52) U.S. Cl.
CPC ....... *G06Q 20/40145* (2013.01); *G06Q 20/20* (2013.01); *G06Q 20/322* (2013.01);
(Continued)

(58) Field of Classification Search
USPC ..................................................... 705/50–79
See application file for complete search history.

(56) References Cited

U.S. PATENT DOCUMENTS 8,306,256 B2* 11/2012 Muriello ................. G06F 21/44
382/100
8,364,552 B2* 1/2013 Ciurea ............... G06Q 20/3224
705/26.1
(Continued)

FOREIGN PATENT DOCUMENTS

CA 2850854 A1 * 6/2013 ........... G06T 3/0068
EP 1549036 A1 6/2005
(Continued)

OTHER PUBLICATIONS

Nguyen, "Personalized Image-based User Authentication using Wearable Cameras", downloaded from https://arxiv.org/pdf/1612.06209.pdf and attached as PDF. (Year: 2017).*
(Continued)

*Primary Examiner* — James D Nigh
*Assistant Examiner* — Margaret M Neubig
(74) *Attorney, Agent, or Firm* — Hunton Andrews Kurth LLP (57) ABSTRACT

Systems and methods for authenticating transactions from a mobile device are described, including authenticating a user and a merchant location. A remote server receives an authentication request from a point-of-sale device, and requests that a user's mobile device use an associated camera to take a picture of the user at the merchant location. The remote server then processes the picture to determine the authenticity of the user and the location, and provides an authentication approval or denial to the point-of-sale device, instructing the point-of-sale device to execute, or not to execute, the transaction.

20 Claims, 7 Drawing Sheets

(51) Int. Cl.
  *G06Q 20/32*    (2012.01)
  *G06V 10/10*    (2022.01)
  *G06V 40/50*    (2022.01)
  *G06V 40/16*    (2022.01)
  *G06V 40/12*    (2022.01)
  *G06Q 20/20*    (2012.01)
  *G06F 16/50*    (2019.01)

(52) U.S. Cl.
  CPC ............... *G06T 7/70* (2017.01); *G06V 10/17* (2022.01); *G06V 40/1365* (2022.01); *G06V 40/172* (2022.01); *G06V 40/50* (2022.01); *G06F 16/50* (2019.01)

(56) References Cited

U.S. PATENT DOCUMENTS

| | | | |
|---|---|---|---|
| 8,521,131 | B1 | 8/2013 | Ramalingam et al. |
| 8,577,810 | B1 | 11/2013 | Dalit et al. |
| 9,503,894 | B2* | 11/2016 | Shanmugam ....... H04W 12/065 |
| 10,235,606 | B2* | 3/2019 | Miao .................... G06T 7/33 |
| 2005/0041840 | A1 | 2/2005 | Lo |
| 2008/0275819 | A1* | 11/2008 | Rifai ...................... G06Q 20/32 |
| | | | 705/44 |
| 2009/0089869 | A1* | 4/2009 | Varghese .............. G06F 21/566 |
| | | | 726/7 |
| 2010/0267432 | A1 | 10/2010 | Roberge et al. |
| 2011/0258075 | A1 | 10/2011 | Ciurea |
| 2012/0028609 | A1 | 2/2012 | Hruska |
| 2012/0252411 | A1* | 10/2012 | Johnsgard ........... H04L 63/0861 |
| | | | 455/411 |
| 2012/0278155 | A1* | 11/2012 | Faith ..................... G06V 40/16 |
| | | | 705/44 |
| 2013/0015946 | A1* | 1/2013 | Lau ....................... G06V 10/422 |
| | | | 340/5.2 |
| 2014/0279503 | A1* | 9/2014 | Bertanzetti ........ G06Q 20/3221 |
| | | | 705/44 |
| 2014/0373184 | A1* | 12/2014 | Mahaffey ................ G06F 21/88 |
| | | | 726/35 |
| 2015/0073907 | A1* | 3/2015 | Purves ................. G06Q 20/384 |
| | | | 705/14.58 |
| 2016/0019547 | A1 | 1/2016 | Gurnani et al. |
| 2016/0063235 | A1 | 3/2016 | Tussy |
| 2017/0168586 | A1* | 6/2017 | Sinha ..................... G06V 40/11 |
| 2018/0189960 | A1* | 7/2018 | Martin ................... G06V 10/95 |
| 2018/0225869 | A1* | 8/2018 | Upendran ............... G06T 17/05 |
| 2019/0278976 | A1* | 9/2019 | Khadloya ............ G08B 13/194 |
| 2019/0294900 | A1* | 9/2019 | Li .......................... G06V 40/70 |

FOREIGN PATENT DOCUMENTS

| | | |
|---|---|---|
| GB | 2536659 A | 9/2016 |
| WO | 2012135372 A2 | 10/2012 |
| WO | WO-2018151822 A1 * | 8/2018 ......... G06F 21/6245 |

OTHER PUBLICATIONS

"Distinctive Image Features", downloaded from https://www.cs.ubc.ca/~lowe/papers/ijcv04.pdf, and dated 2004, attached as PDF file (Year: 2004).*

"Distinctive Image Features", downloaded from https://www.cs.ubc.ca/~lowe/papers/ijcv04.pdf, and dated 2004, previously attached as PDF file (Year: 2004) (Year: 2004).*

Extended European Search Report issued from the European Patent Office to corresponding EP Application No. 19184698.9 dated Nov. 14, 2019.

* cited by examiner

SYSTEM AND METHOD FOR AUTHENTICATING TRANSACTIONS FROM A MOBILE DEVICE

CROSS-REFERENCE TO RELATED APPLICATIONS

This application is a divisional of U.S. patent application Ser. No. 16/032,303, filed on Jul. 11, 2018, which is expressly incorporated by reference herein, in its entirety.

FIELD OF THE INVENTION

The present invention relates to the authentication of transactions using a mobile device.

BACKGROUND

As mobile devices have become common among consumers, the corresponding popularity of executing transactions using those mobile devices has provided an increased opportunity for fraud, and an increased need to properly authenticate the participants to the transaction. Where those participants are identified by, or represented by, e.g., mobile devices or point-of-sale ("POS") devices, the need for authentication further extends to those devices. Systems for executing transactions using a mobile device to identify the user or consumer run the risk of executing the transaction for a false user, using a false device, or at a false merchant location.

If a false user is conducting the transaction using the mobile device, that false user may have obtained the mobile device through theft or fraud, and may have bypassed the user identification strategies of the mobile device. For example, the false user may have illegitimately identified the user's personal passwords, or forged a fingerprint capable of circumventing a fingerprint identification functionality of the mobile device. The variety of mobile devices available to consumers means that such mobile devices have varying levels of security functionality, leaving many users with limited ways to authenticate a transaction.

Further, authenticating the user alone does not achieve a sufficient level of security to protect the transaction. A false mobile device may be used for the transaction, for example, as a "spoofed" device mimicking the device of another consumer. A false merchant may be using a faked POS device to imitate a true merchant.

There is a need for systems and methods for authenticating transaction participants, using technology common to mobile devices.

SUMMARY

To address these problems, the following systems and methods authenticate components of a transaction: one party, the user; and the counterparty or merchant associated with a location such as a store or point of sale. Authenticating the location of the transaction, while also authenticating the user, provides necessary additional security for transactions that may otherwise be fraudulently executed. The user's mobile device may further be authenticated. The systems and methods of the present invention provide a greater level of security to transactions using mobile devices. Further, by utilizing a remote server, the additional security features are not limited to any particular mobile device; if the mobile device has access to a camera and to the remote server, it can use these security features.

In an exemplary embodiment, authenticating components of a transaction may include receiving, by an authentication server, via a network, an authentication request from a device associated with a location, the authentication request including information identifying a user participating in the transaction; transmitting, by the authentication server, via the network, a picture request to a mobile device associated with the user; receiving, by the authentication server, via the network, a picture taken by the mobile device in response to the picture request, wherein the picture includes an image of at least a portion of the user and at least a portion of the location; analyzing, by the authentication server, the image to determine the probability that the image includes the user, including comparing the image to images of the user stored in an identification database; analyzing, by the authentication server, the image to determine the probability that the image includes the location, including comparing the image to images of the location stored in the identification database; and, if the probability that the image includes the user is above a user probability threshold, and the probability that the image includes the location is above a location probability threshold, transmitting, by the authentication server, via the network, an authentication approval response to the device associated with the location.

The authentication may include comparing, by the authentication server, characteristics of the picture with information stored in the identification database, the information being associated with the mobile device, to determine the probability that the picture was taken by the mobile device associated with the user. The characteristics of the picture compared with information stored in the identification database may include at least one of the following: (a) pixel count; (b) resolution.

The picture may be taken by the mobile device in response to the picture request without additional commands from the user.

Analyzing the image to determine the probability that the image includes the user may include comparing the angle at which the picture was taken, with the angle of images of the user stored in an identification database.

The authentication may include automatically transmitting, from the mobile device, via the network, the images of the user to be stored in the identification database.

The authentication may include storing, in the identification database, images from previous picture requests associated with the user. The authentication may further include using the images from previous picture requests associated with the user to train the authentication server to determine the probability that an image includes the user.

The authentication may include storing, in the identification database, images from previous picture requests associated with the location. The authentication may further include using the images from previous picture requests associated with the location to train the authentication server to determine the probability that an image includes the location.

The step of analyzing the image to determine the probability that the image includes the user may be performed, and then the user's image may be removed from the image, and the step of analyzing the image to determine the probability that the image includes the location may then performed.

In an exemplary embodiment, a system for authenticating components of a transaction includes an identification database containing user identification information including reference images of a user, information identifying a mobile device associated with the user, and location identification information including reference images of a location; and an authentication server, in communication with the identification database, including an authentication processor programmed to receive an authentication request from a device associated with the location, the authentication request including information identifying the user participating in the transaction; transmit a picture request to the mobile device; receive a picture taken by the mobile device in response to the picture request, wherein the picture includes an image of the at least a portion of the user and at least a portion of the location; analyze the image to determine the probability that the image includes the user, including comparing the image to images of the user stored in the identification database; analyze the image to determine the probability that the image includes the location, including comparing the image to images of the location stored in the identification database; and if the probability that the image includes the user is above a user probability threshold, and the probability that the image includes the location is above a location probability threshold, transmitting an authentication approval response to the device associated with the location.

The authentication server may be programmed to compare characteristics of the picture with information stored in the identification database, the information being associated with the mobile device, to determine the probability that the picture was taken by the mobile device associated with the user.

The authentication server may be programmed to compare the angle at which the picture was taken, with the angle of images of the user stored in an identification database.

The authentication server may be programmed to store, in the identification database, images from a previous picture request associated with the user; and use the stored images in later analysis to determine the probability that a later-taken image includes the user.

The authentication server may be programmed to store, in the identification database, images from a previous picture request associated with the location; and use the stored images in later analysis to determine the probability that a later-taken image includes the location.

The authentication server may be programmed to receive the results of a fingerprint identification taking place at the mobile device.

The authentication system may include the device associated with the location, and the device associated with the location may be programmed to execute the transaction only if the authentication server provides an authentication approval response.

The authentication server may be programmed to transmit an alert to the user if the probability that the image includes the user is below the user probability threshold; and transmit an alert to the location if the probability that the image includes the location is below the user probability threshold.

In an exemplary embodiment, authenticating components of a transaction may include receiving, by a mobile device associated with a user, via a network, a picture request from an authentication server; initiating a camera associated with the mobile device to take a picture, wherein the picture includes an image of at least a portion of the user and at least a portion of a real-time location of the user; and transmitting, by the mobile device, via the network, the picture to the authentication server.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

In a transaction between a user and a merchant, the user may be represented electronically by a mobile device, and the merchant may be represented electronically by a point-of-sale ("POS") device. The following systems and methods operate to authenticate the user, the merchant, or their respective devices.

Figure 1:
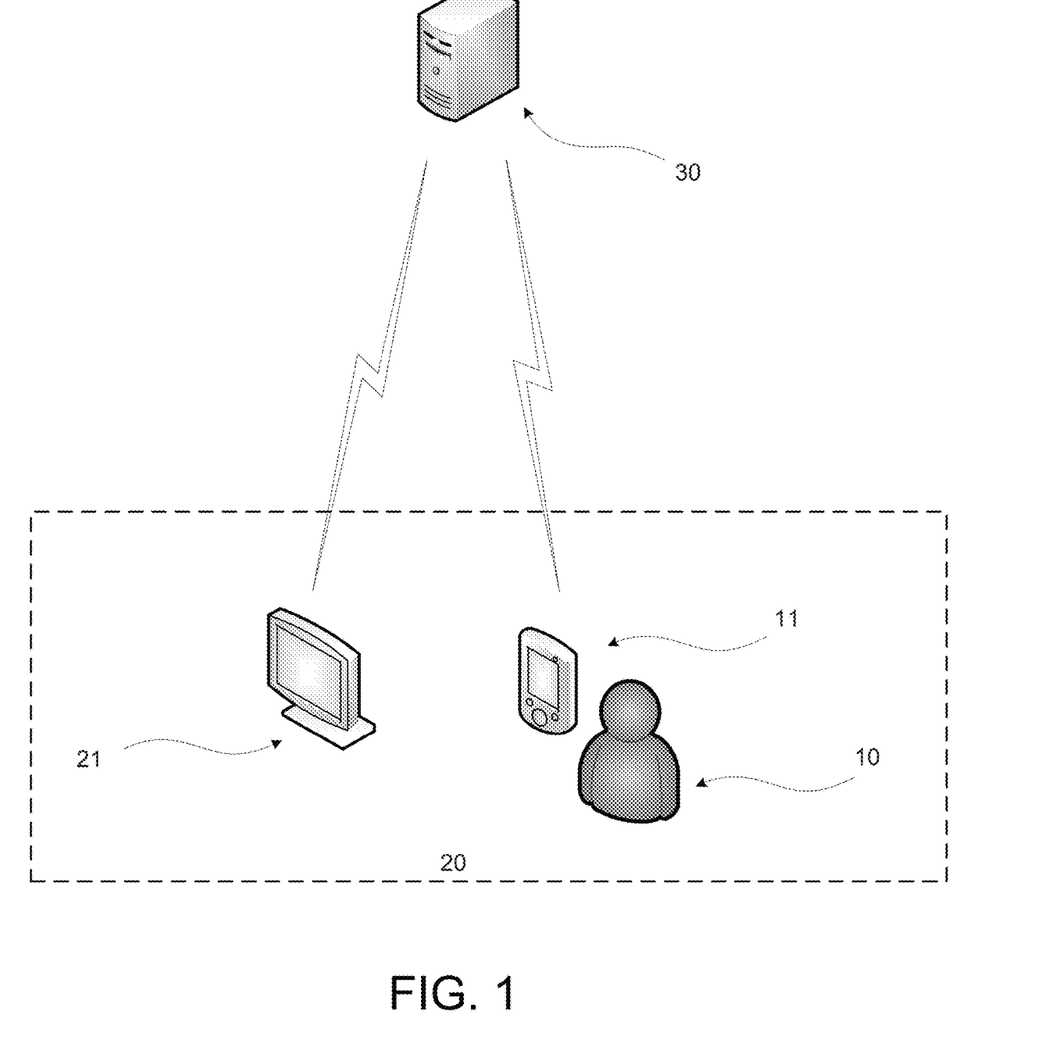
FIG. 1 is an illustration of an authentication system, in accordance with an example embodiment of the present invention.

The overall system is illustrated broadly in FIG. 1. The user 10, carrying mobile device 11, seeks to execute a transaction with a merchant (not pictured) at the merchant's location 20, such as a store, office, booth, or any other physical place of business where repeated transactions are executed.

Mobile device 11 may be any known mobile device, such as a smartphone, personal digital assistant, tablet computer, wearable device (such as a smartwatch), digital camera, or other computing device capable of communicating with a remote server 30 or capable of local communication with a local device for communicating with a remote server 30. The mobile device 11 includes a camera, and the ability to connect to a remote server on a network, such as via the Internet. At least some portion of the systems and methods described as being carried out by the mobile device may be divided among mobile devices carried by the user. For example, if the user is carrying one device communicating with a remote server (such as a smartphone), and a separate device for taking pictures (such as a wearable computing device), the two mobile devices of the user may coordinate to carry out the invention.

The merchant's location 20 includes POS device 21. POS device 21 may be a computing device, capable of connecting to a remote server on a network, such as via the Internet.

To authenticate the requested transaction, the user's mobile device 11 and the merchant's POS device 21 communicate with a remote authentication server 30. Server 30 includes an identification database for storing information associated with a user or merchant. For example, the identification database may store account information, contact information (e.g., telephone numbers, email addresses, IP addresses associated with mobile devices or POS devices), pictures and other information used to authenticate a user, a user's mobile device, or a merchant location in which the user and merchant are attempting to execute a transaction. Server 30 further includes processing capabilities for writing into the identification database, reading from the identification database, and comparing information received from the mobile device 11 and POS device 21 to the information stored in the identification database. The information stored in the identification database may also be stored across multiple databases, as long as the server 30 is able to access the information as needed.

Figure 2:
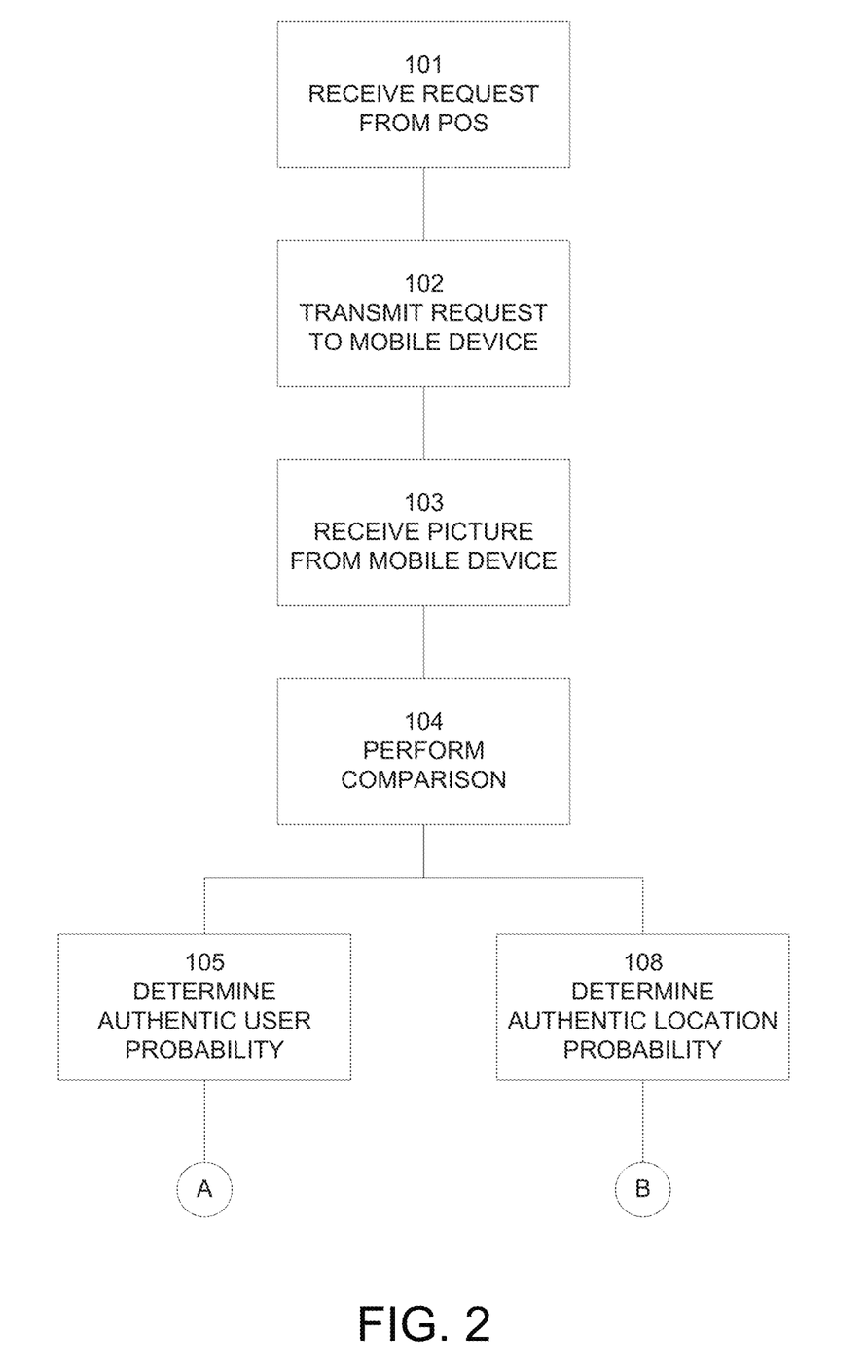
FIG. 2 is a flowchart illustrating a method for determining the probability of an authentic user and merchant location, in accordance with an example embodiment of the present invention.
Figure 3:
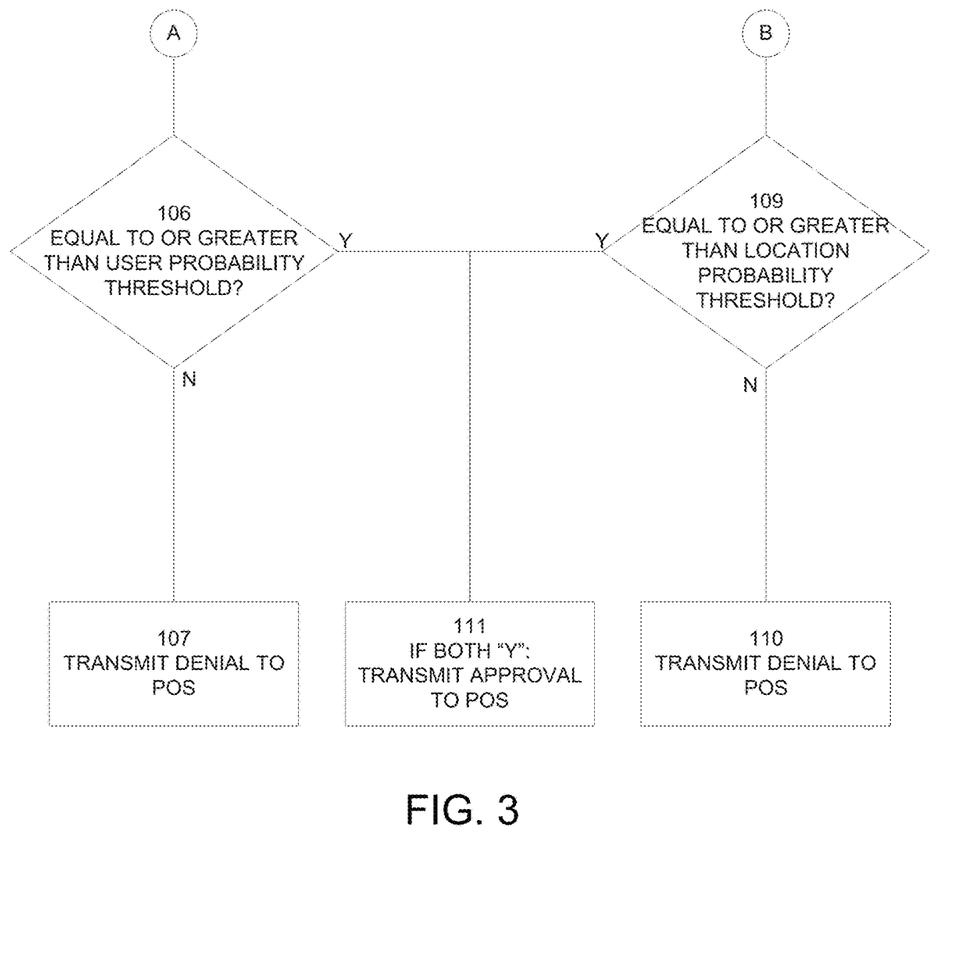
FIG. 3 is a flowchart illustrating a method for determining the authenticity of a user and merchant location, in accordance with an example embodiment of the present invention.

In an exemplary embodiment, as illustrated in FIGS. 2 and 3, when the user and/or the merchant initiates a transaction, at step 101 the POS device 21 transmits an authentication request to the authentication server 30. The request may include information purporting to identify the participants in the transaction, such as the user, the user's mobile device, the merchant, or the POS. The identification information may take the form of readily identifiable information, e.g., names or addresses, or may take the form of coded or indexed reference information, e.g., usernames or customer numbers. The request may further include information describing the transaction, such as the nature of a product or service provided by the merchant or the value of goods being exchanged.

Upon receiving the request from the POS device 21, the server 30 extracts the user identification information to associate the request with a user. The server 30 then identifies contact information for the user's mobile device 11, such as a telephone number, email address, or IP address. At step 102, the server initiates a communication to the mobile device 11, the communication including a request for a picture.

Figure 5:
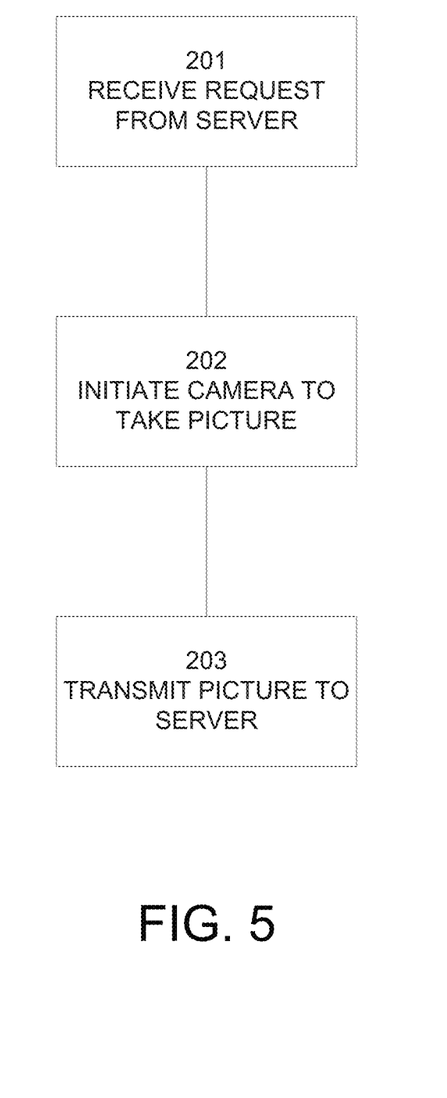
FIG. 5 is a flowchart illustrating a method for obtaining input for determining the authenticity of a user, a user mobile device, or a merchant location, in accordance with an example embodiment of the present invention.

Upon receiving the request from the server 30, the mobile device 11 may initiate the exemplary embodiment illustrated in FIG. 5. At step 201, the mobile device 11 receives the request from the server, and parses the request to determine that the server 30 is requesting a picture. The mobile device 11 then initiates a connected camera to take a picture. The camera may be built into the mobile device 11, or may be connected (either by wire, or wirelessly) to the mobile device.

In an exemplary embodiment, the request from the server 30 initiates a message to be displayed on the mobile device 11, informing the user that a picture is necessary to carry out the transaction. The user may then operate the mobile device 11 to take a picture including at least some part of the user, and at least some part of the location. Once the picture is taken, the mobile device 11 may be used to transmit the picture back to the server 30. The picture may include additional information identifying the user 10, the mobile device 11, and the transaction for which these authentication procedures are supporting.

The request from the server 30 may also include an alternative for the user 10 to provide some indication that the transaction should not be executed. For example, if the user did not initiate the transaction, then the request for the picture will serve as an alert the user that the transaction has been initiated, and the user may be provided with an icon or button for declining the transaction. This may take the form of a command to the server 30 to deny authentication of the transaction.

In an alternative exemplary embodiment, the request from the server 30 may ask for the picture to be taken without displaying an alert on the mobile device 11, or without input from the user. In this manner, if the mobile device 11 has been stolen and is being used illegitimately to carry out the transaction, the illegitimate user will not be made aware of the security measures being enacted, limiting the ability of the illegitimate user to thwart these measures.

Returning to the exemplary embodiment illustrated in FIGS. 2 and 3, the server 30 receives the picture from the mobile device at step 103. The server 30 then carries out recognition processes, at steps 104-106 to compare the picture to information stored in the identification database and determine the probability that the user, or the merchant location, is authentic.

To identify the user 10, the server 30 may use facial recognition programming to compare the image of the user 10 captured in the instant picture, to pictures of the user stored on the identification database. The identification database may store a collection of pictures of the user 10, to be used in identifying the user 10 in the authentication process. For example, the user 10 may be required to take, or upload, one or more pictures of the user 10, possibly from various angles, at a time prior to the transaction, such as when the user's identity can be confirmed in other ways. The server 30 may also request that the mobile device 11 transmit any pictures of the user 10 that are stored locally on the mobile device 11, or stored on another server that the mobile device 11 may access. Further, the server 30 may store in the identification database any pictures of the user 10 that are used for authenticating a transaction, to assist in future authentication processes.

The server processes the picture to compare the image of the user to the images of the user previously stored in the identification database. For example, the server may use machine learning (e.g., a convolutional neural network) to process the previously-stored pictures of the user and compare them to the picture of the user taken during the instant authentication process. The server 30 may compare certain features depicted in the instant image (e.g., hair color, skin tone, size ratio of facial features) to the previously-stored pictures. Recognizing that each user may have a unique, and repeated, way to hold their mobile devices, the server 30 may compare the angle of the picture to the angle of other pictures taken during previous authentication processes.

As a result of this comparison, at step 105, the server determines an authentic user probability, i.e., the probability that the pictured user is authentic. The authentic user probability may be determined based on any metric known to image recognition processing or convolutional neural network models. The authentic user probability may be impacted by several factors. For example, the number of stored pictures of the user in the identification database may impact the authentic user probability. The greater the number of pictures of the user stored in the identification database, the more readily the server will be able to identify the user, so that an identification of the user may be considered more probable if it is based on a large number of pictures. At step 106, the server compares the user probability to a user probability threshold. If the determined user probability is below the user probability threshold, then, at step 107, the server transmits an authentication denial to the POS device 21, instructing the POS device 21 not to execute the transaction. The server 30 may also send a notification to the user or merchant that a fraudulent transaction has been attempted. If the determined user probability is equal to or greater than the user probability threshold, then the server 30 checks whether the determined location probability is equal to or greater than the location probability threshold. If both the determined user probability and the determined location probability are equal to or greater than their respective thresholds, then, at step 111, the server 30 transmits an authentication approval to the POS device 21, instructing the POS device 21 to execute the transaction. The server 30 may also send a notification to the user or merchant that the transaction has been authenticated. The threshold may be defined or adjusted as desired. For example, a high threshold will result in a higher level of security, but will increase the risk that a valid transaction being denied and will use more processing resources, while a low threshold will lessen the level of security, but will reduce the inconvenience of a denied valid transaction and will allow for faster processing.

To identify the location 20, the server 30 may use visual imagery recognition programming to compare the image of the location 20 captured in the instant picture, to pictures of the location stored on the identification database. The identification database may store a collection of pictures of the location 20, to be used in identifying the location 20 in the authentication process. For example, the merchant may be required to take, or upload, one or more pictures of the location 20, possibly from angles that are expected to by commonly used by users in the authentication processes, at a time prior to the transaction, such as when the location's authenticity can be confirmed in other ways. The server 30 may store in the identification database any pictures of the location 20 that are used for authenticating a transaction (whether by the instant user or by other users), to assist in future authentication processes.

In particular, the stored pictures of the location may be focused on particular POS devices 21 within a merchant location 20. For example, if a merchant location has five POS devices, the pictures taken by a user's mobile device 11 may include different parts of the location, depending on which POS device 21 is executing the transaction. Therefore, each POS device 21 may have its own associated pictures.

The server processes the picture to compare the image of the location to the images of the location previously stored in the identification database, associated with the relevant POS device 21. For example, the server may use machine learning (e.g., a convolutional neural network) to process the previously-stored pictures of the location and compare them to the picture of the location taken during the instant authentication process. The server 30 may compare certain features depicted in the instant image (e.g., color or materials of the walls, ceiling, or floor, identifying damage, the size ratio of visible structures) to the previously-stored pictures. The server 30 may compare the angle of the picture to the angle of other pictures taken during previous authentication processes, that were associated with that particular POS device 21.

As a result of this comparison, at step 108, the server determines an authentic location probability, i.e., the probability that the pictured location is authentic. The authentic location probability may be determined based on any metric known to image recognition processing or convolutional neural network models. The authentic location probability may be impacted by several factors. For example, the number of stored pictures of the location in the identification database may impact the authentic location probability. The greater the number of pictures of the location stored in the identification database, the more readily the server will be able to identify the location, so that an identification of the location may be considered more probable if it is based on a large number of pictures. At step 109, the server compares the location probability to a location probability threshold. If the determined location probability is below the location probability threshold, then, at step 110, the server transmits an authentication denial to the POS device 21, instructing the POS device 21 not to execute the transaction. The server 30 may also send a notification to the user or merchant that a fraudulent transaction has been attempted. If the determined location probability is equal to or greater than the location probability threshold, then the server 30 checks whether the determined user probability is equal to or greater than the location probability threshold. If both the determined user probability and the determined location probability are equal to or greater than their respective thresholds, then, at step 111, the server 30 transmits an authentication approval to the POS device 21, instructing the POS device 21 to execute the transaction. The server 30 may also send a notification to the user or merchant that the transaction has been authenticated. The threshold may be defined or adjusted as desired. For example, a high threshold will result in a higher level of security, but will increase the risk that a valid transaction being denied and will use more processing resources, while a low threshold will lessen the level of security, but will reduce the inconvenience of a denied valid transaction and will allow for faster processing.

Identifying a location may present a more difficult processing task than identifying a user. For example, as various users may appear in different positions in a picture, different portions of the location will appear in different pictures, and different portions will be obscured by the image of the user. It may be advantageous to set a lower location probability threshold, for example, in comparison to the user probability threshold. It may further be advantageous to set a limit on the minimum number of stored pictures that must be determined to match the location before the location can be considered properly identified.

In an exemplary embodiment, steps 105 and 106 for authenticating the user may be carried out first, before steps 108 and 109 for authenticating the location. The server 30 may process the picture to recognize and authenticate the image of the user 10. Once the user 10 has been authenticated, the server may again process the picture by removing the image of the user, and then exclusively processing the image of the location.

The server may be able to identify the user or location based on one stored picture, but the ability of the server to properly identify the user or location may increase with the number of stored pictures. The server may also undergo regular training to improve its recognition. For example, the server may be implementing a particular machine learning model in its recognition processes, and that model may be updated as additional pictures or other information yield improvements. In a particular example, the server may be trained regularly, e.g., once per day, at a time when the server typically experiences low service requirements, e.g., early morning. The model may also be developed and updated on a separate server, and loaded to the server 30.

In certain embodiments, for example, in the use of a convolutional neural network, the embeddings of the pictures may be stored in the identification server, instead of the entire picture. The embeddings are a small vector of numbers that represents the picture. This will help to reduce storage space and calculation time.

Figure 6:
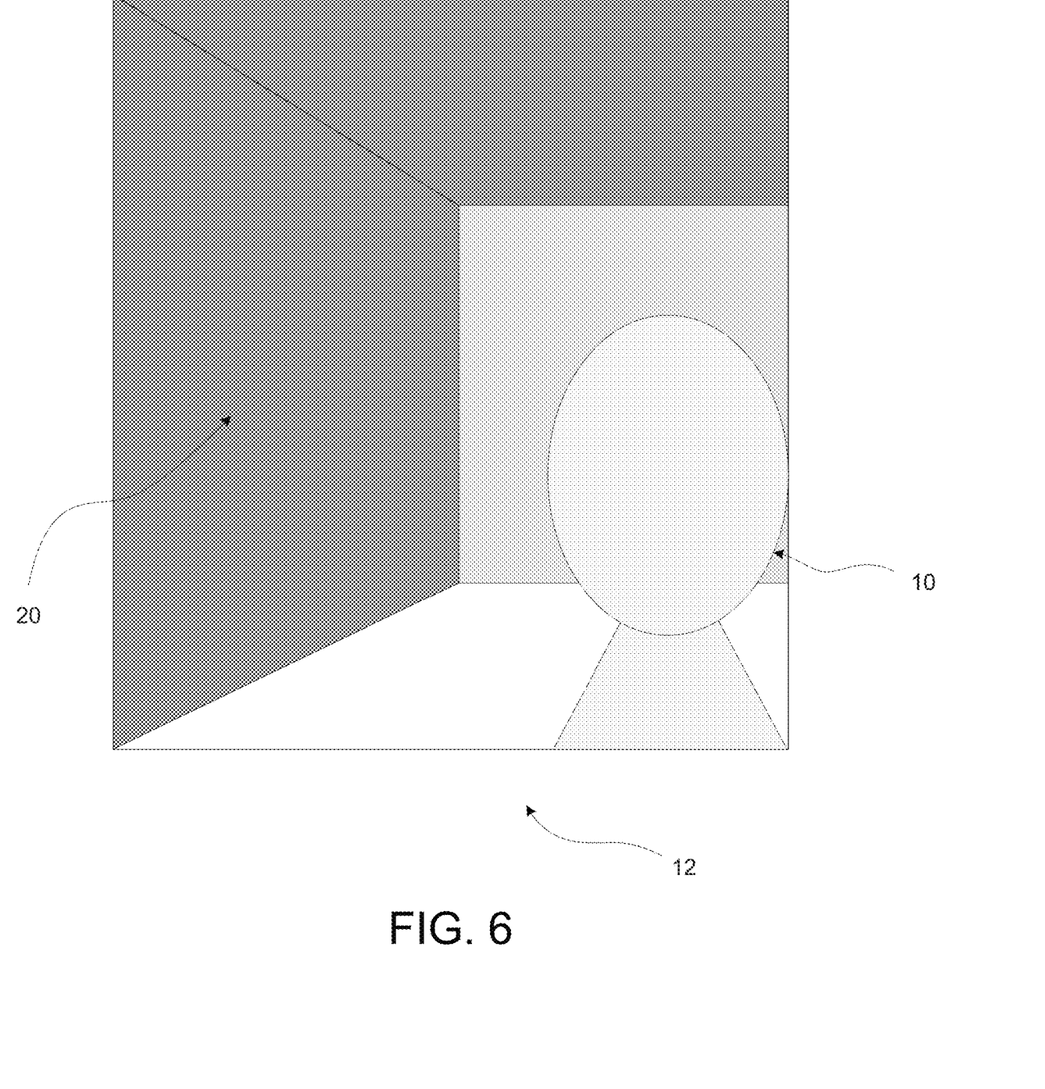
FIG. 6 is an illustration of an exemplary picture to be used in the authentication system, in accordance with an example embodiment of the present invention.

An exemplary embodiment of the picture 12 is illustrated in FIG. 6. The user 10 is depicted in the foreground of picture 12, with at least a portion of the location 20 captured in the background. The illustration of FIG. 6 is exemplary; the picture 12 should include at least some part of the user sufficient to identify that user, and at least some part of the background location sufficient to identify the location. In the exemplary illustration of FIG. 6, the image of the user 10 may be compared to the images in the pictures of the user stored in the identification database, and the image of the background location 20 may be compared to the images in the pictures of the background location 20 stored in the identification database, or, more specifically, with those pictures associated with the POS device 21 that being used in the transaction.

Figure 4:
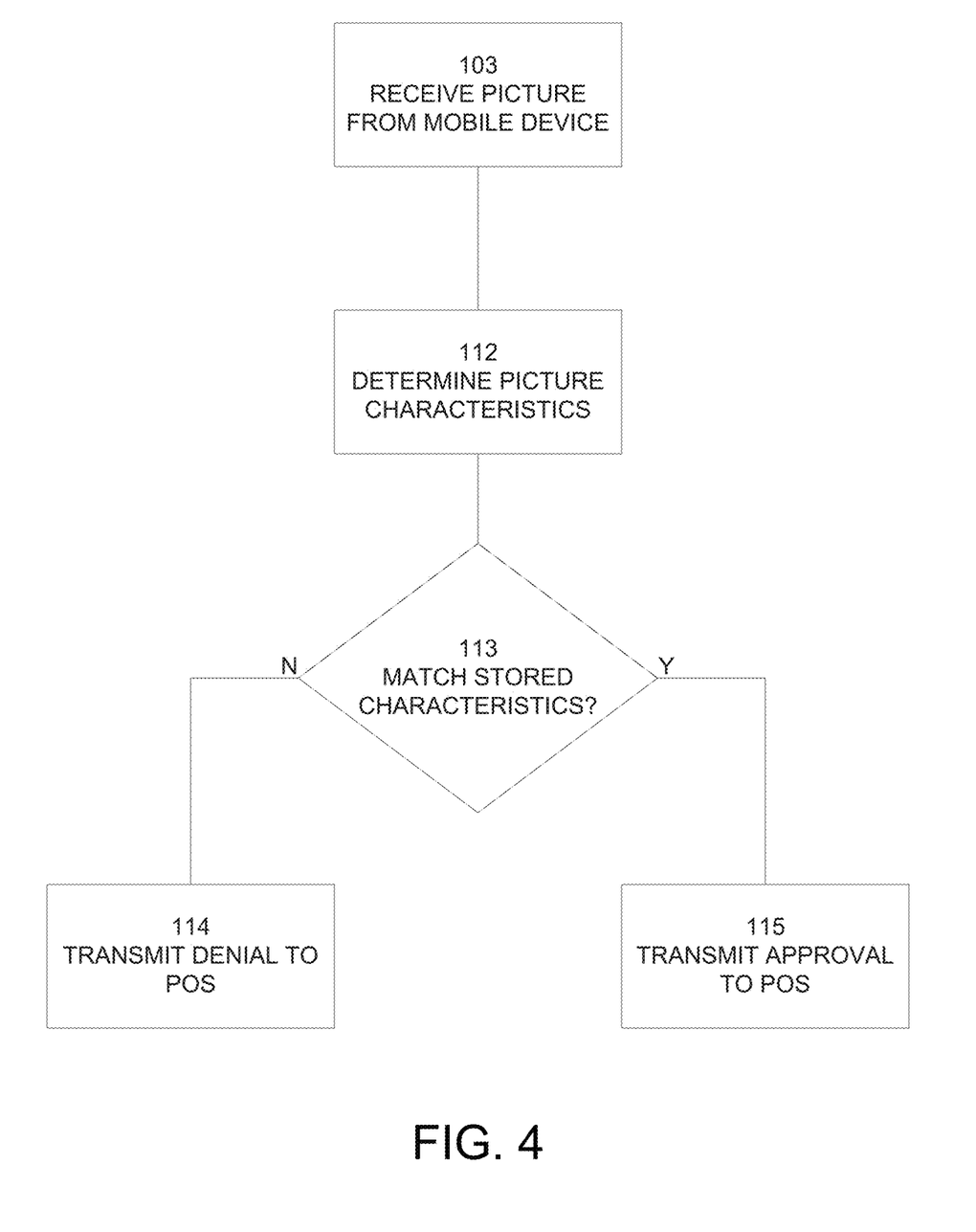
FIG. 4 is a flowchart illustrating a further method for determining the authenticity of a user mobile device, in accordance with an example embodiment of the present invention.

In addition to authenticating the user 10, and the location 20, the picture taken by the mobile device 11 may be used to authenticate the mobile device 11, for an additional layer of security. In the exemplary embodiment illustrated in FIG. 4, the server 30 receives the picture form the mobile device 11, just as in FIGS. 2 and 3. The picture may have certain characteristics useful in identifying the mobile device 11. For example, the picture may have a certain size, ratio, pixel quality, or pixel count. At step 112, these characteristics may be determined by the server in analyzing the picture, or may be included in metadata transmitted with the picture. The server 30 may have characteristics of the mobile device 11 stored in the identification database, allowing the server 30, at step 113, to match the characteristics of the picture to determine whether the mobile device 11 that took the picture is the mobile device associated with the user 10. If the information matches, the server 30 may transmit an authentication approval to the POS device 21, instructing the POS device 21 not to execute the transaction. If the information does not match, the server 30 may transmit an authentication denial to POS device 21, instructing the POS device 21 to execute the transaction. In either case, the server 30 may also send a notification to the user or merchant including the results of the comparison.

Figure 7:
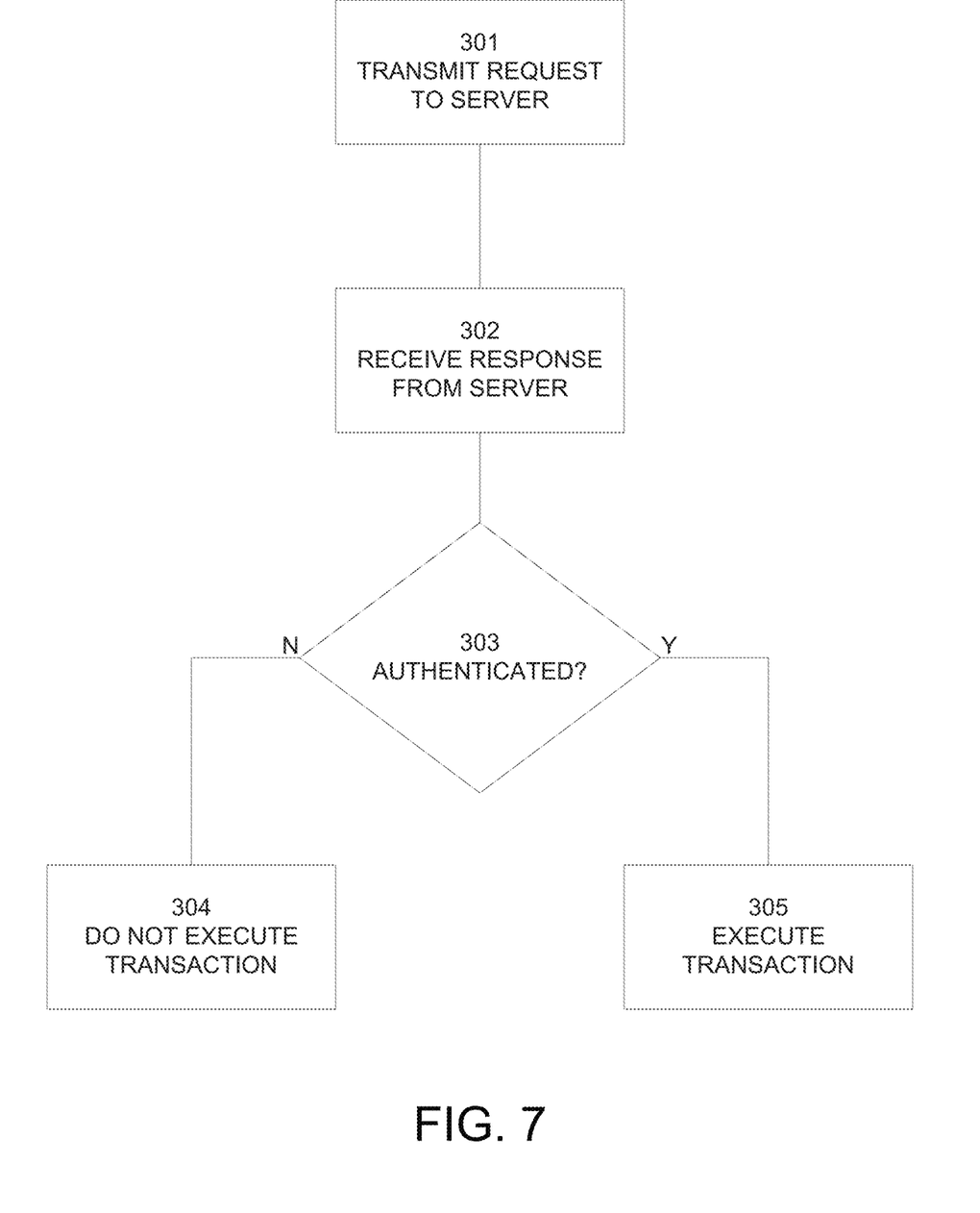
FIG. 7 is a flowchart illustrating a method for requesting a determination of the authenticity of a user, a user mobile device, or a merchant location, and responding thereto, in accordance with an example embodiment of the present invention.

In an exemplary embodiment, the process of the POS device 21 is illustrated in FIG. 7. After transmitting an authentication request to the server 30 in step 301, the POS device 21 waits for the response from the server 30, which may include an authentication approval or an authentication denial. At step 302, the POS device 21 receives the response from the server 30, and determines, at step 303, whether the response is an approval or a denial. If the server 30 provided an authentication denial, then at step 304 the POS device 21 does not execute the transaction. If the server 30 provided an authentication approval, then at step 305 the POS device 21 executes the transaction.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method for authenticating components of a transaction, comprising:
   receiving, by a mobile device having a user, via a network, a picture request from an authentication server, wherein the picture request specifies that a picture is to be taken without displaying an alert on the mobile device and without input from the user;
   initiating, by the mobile device, a camera associated with the mobile device to take the picture, wherein the picture includes an image of at least a portion of the user and at least a portion of a real-time location of the user;
   transmitting, by the mobile device, via the network, the picture to the authentication server;
   analyzing, by the authentication server, the picture to determine the probability that the picture includes at least a portion of a merchant location associated with a known POS device, including comparing the picture to images of the merchant location stored in the identification database by applying a convolutional neural network to compare a plurality of features of the picture to a plurality of features of the images of the known POS device stored in the identification database, wherein the comparison comprises comparing the size ratio of at least one visible structure within the picture and the images of the merchant location;
   determining, by the authentication server, the probability that the picture includes an image of the merchant location associated with the known POS device is above a location probability threshold;
   based on the determining that the picture includes an image of the merchant location associated with the POS device is above the location probability threshold, transmitting, by the authentication server, via the network, an authentication approval response to the known POS device;
   storing, by the authentication server, the picture in the identification database; and
   training, by the authentication server, the convolutional neural network with the picture and the images of the merchant location stored in the identification database.

2. The method of claim 1, wherein:
   the picture further includes information associated with the camera including
   at least one of the following group: (a) a pixel count, and (b) an image resolution,
   the information associated with the camera is stored in the identification database, and
   the information associated with the camera is used to train the model along with the picture.

3. The method of claim 1, wherein:
   the camera is physically separate from the mobile device, and
   the camera is in wireless communication with the mobile device.

4. The method of claim 1, wherein the picture is taken by the mobile device in response to the picture request, without additional commands from the user.

5. The method of claim 4, wherein the picture is taken by the mobile device without displaying, on the mobile device, any indication of the initiation of the camera to take the picture.

6. The method of claim 1, further comprising:
displaying, on a display of the mobile device, an alert that the picture request has been received by the mobile device; and
displaying, on the display of the mobile device, at least one selectable icon for approving or declining the picture request.

7. The method of claim 1, further comprising:
receiving, by the mobile device, via the network, an authentication approval response from the authentication server; and
displaying, on a display of the mobile device, an alert that the transaction is approved.

8. The method of claim 1, further comprising:
receiving, by the mobile device, via the network, an authentication denial response from the authentication server; and
displaying, on a display of the mobile device, an alert that the transaction is denied.

9. The method of claim 1, further comprising:
receiving, by the mobile device, via the network, a request from the authentication server for a fingerprint identification of the user;
transmitting, by the mobile device, via the network, to the authentication server, the results of the fingerprint identification.

10. The method of claim 1, further comprising:
receiving, by the mobile device, via the network, a request from the authentication server for images of the user previously stored on the mobile device;
transmitting, by the mobile device, via the network, to the authentication server, the stored images of the user.

11. The method of claim 1, wherein:
the plurality of features of the picture includes the angle at which the picture was taken, and
the plurality of features of the images of the known POS device includes the angles of the images.

12. The method of claim 1, further comprising determining, by the authentication server prior to sending the picture request, that the transaction may be illegitimate.

13. The method of claim 1, further comprising:
receiving, by the mobile device, via the network, a second picture request from the authentication server, wherein the second picture request specifies that a second picture is to be taken without displaying an alert on the mobile device and without input from the user;
initiating the camera to take the second picture, wherein the second picture includes an image of at least a portion of the user and at least a portion of a real-time location of the user;
transmitting, by the mobile device, via the network, the second picture to the authentication server;
analyzing, by the authentication server, the second picture to determine the probability that the second picture includes at least a portion of a merchant location associated with the known POS device, including comparing the second picture to images of the merchant location stored in the identification database by applying a convolutional neural network to compare a plurality of features of the second picture to a plurality of features of the images of the known POS device stored in the identification database, wherein the comparison comprises comparing the size ratio of at least one visible structure within the second picture and the images of the merchant location;
determining the probability that the second picture includes an image of the merchant location associated with the known POS device is below a location probability threshold; and
transmitting, by the authentication server, via the network, an authentication denial response to the known POS device.

14. The method of claim 1, further comprising, prior to analyzing the picture, setting, by the server, a minimum number of images of the location associated with the known POS device that must be stored in the database.

15. A system for use in authenticating components of a transaction, comprising:
an authentication server; and
a mobile device comprising a mobile device processor and a camera, wherein the mobile device processor is programmed to:
receive, via a network, a picture request from an authentication server, wherein the picture request specifies that a picture is to be taken without displaying an alert on the mobile device and without input from the user;
initiate the camera to take a picture, wherein the picture includes an image of at least a portion of a user and at least a portion of a real-time location of the user; and
transmit, via the network, the picture to the authentication server; and
wherein the authentication server is configured to:
analyze the pictures to determine the probability that the picture includes at least a portion of a merchant location associated with a known POS device, including comparing the picture to images of the merchant location stored in the identification database by applying a convolutional neural network to compare a plurality of features of the picture to a plurality of features of the images of the known POS device stored in the identification database, wherein the comparison comprises comparing the size ratio of at least one visible structure within the picture and the images of the merchant location;
if the probability that the picture includes an image of the merchant location associated with the known POS device is above a location probability threshold, transmit, via the network, an authentication approval response to the known POS device;
storing the picture in the identification database; and
training the convolutional neural network with the picture and the images of the merchant location stored in the identification database.

16. The system of claim 15, wherein the picture is taken by the mobile device in response to the picture request without displaying, on the mobile device, any indication of the initiation of the camera to take the picture.

17. The system of claim 15, the mobile device processor further programmed to:
receive, via the network, an authentication approval response from the authentication server; and
displaying, on a display of the mobile device, an alert that the transaction is approved.

18. The system of claim 15, the mobile device processor further programmed to:
receive, via the network, an authentication denial response from the authentication server; and display, on a display of the mobile device, an alert that the transaction is denied.

19. The system of claim 15, the mobile device processor further programmed to:
receive, via the network, a request from the authentication server for images of the user previously stored on the mobile device;
transmit, via the network, to the authentication server, the stored images of the user.

20. A non-transitory computer-readable medium containing instructions that, when executed by a computer hardware arrangement comprising an authentication server and a mobile device comprising a mobile device processor and a camera, configure the computer hardware arrangement to perform procedures comprising:
a mobile device comprising a mobile device processor and a camera, wherein the mobile device processor is programmed for:
receiving, by the mobile device processor via a network, a picture request from an authentication server, wherein the picture request specifies that a picture is to be taken without displaying an alert on the mobile device and without input from the user;
initiating, by the mobile device processor, the camera to take a picture, wherein the picture includes an image of at least a portion of a user and at least a portion of a real-time location of the user;
transmitting, by the mobile device processor via the network, the picture to the authentication server;
analyzing, by the authentication server, the picture to determine the probability that the picture includes at least a portion of a merchant location associated with a known POS device, including comparing the picture to images of the merchant location stored in the identification database by applying a convolutional neural network to compare a plurality of features of the picture to a plurality of features of the images of the known POS device stored in the identification database, wherein the comparison comprises comparing the size ratio of at least one visible structure within the picture and the images of the merchant location;
if the probability that the picture includes an image of the merchant location associated with the known POS device is above a location probability threshold, transmitting, by the authentication server via the network, an authentication approval response to the known POS device;
storing, by the authentication server, the picture in the identification database; and
training, by the authentication server, the convolutional neural network with the picture and the images of the merchant location stored in the identification database.

* * * * *